INVENTOR
JOHANNES M. SCHAEFER
ATTORNEY

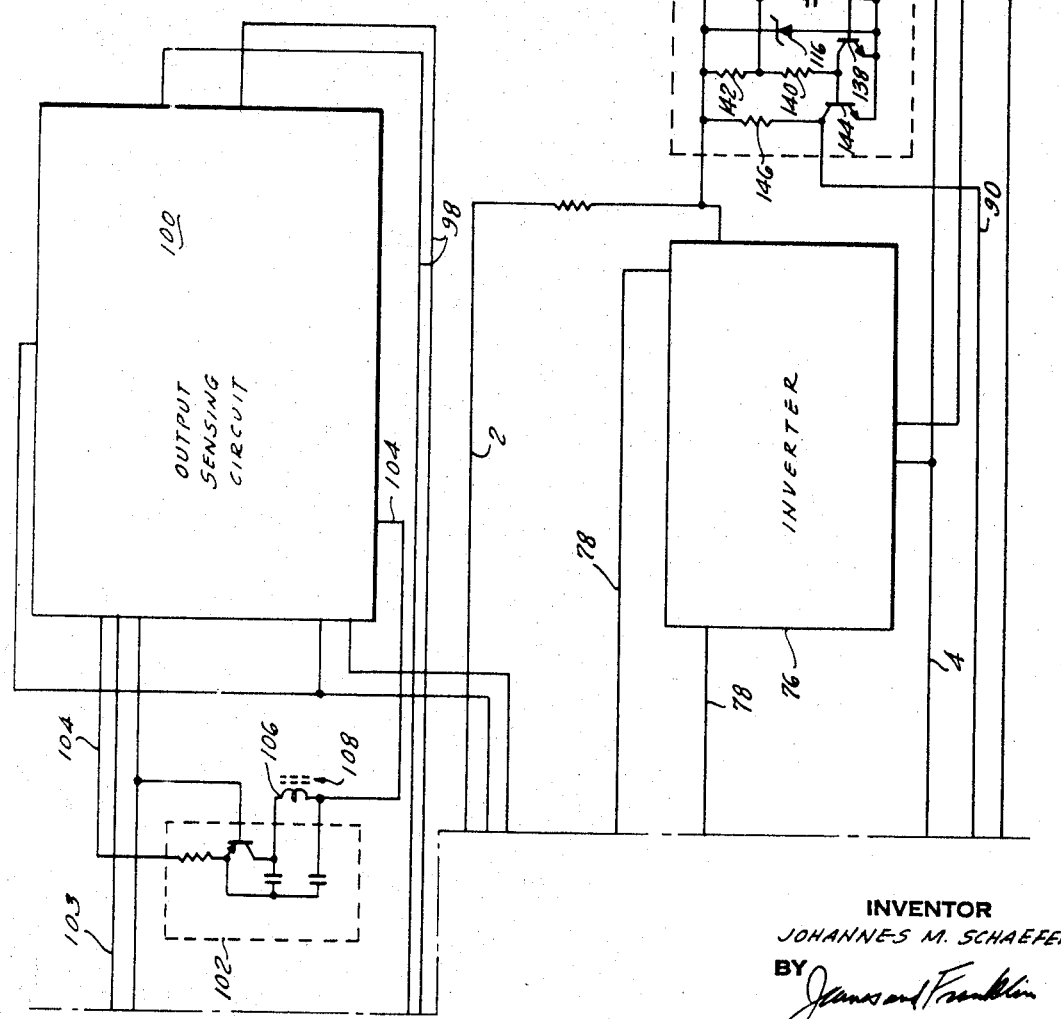

United States Patent Office 3,439,251
Patented Apr. 15, 1969

3,439,251
REGULATED POWER SUPPLY WITH SWITCHING TRANSISTORS
Johannes M. Schaefer, Wilton, Conn., assignor to Technipower Incorporated, South Norwalk, Conn., a corporation of Connecticut.
Filed Jan. 9, 1967, Ser. No. 608,193
Int. Cl. H02m 1/18, 3/22, 5/40
U.S. Cl. 321—11                     15 Claims

ABSTRACT OF THE DISCLOSURE

A power supply having a pair of switching transistors connected in series across the input line adapted to be alternately energized with varying on-off times as determined by one or more sensed circuit parameters, said circuit being effective to ensure that both transistors are never simultaneously on, to prevent output transients or other irregularities from causing excessive transistor switching, to balance the output of each transistor, and to provide overriding control in accordance with energizing cuurent or the like. In one embodiment a capacitor is connected in shunt with only one of the switching transistors, the other of the switching transistors having no capacitor connected thereacross.

---

Figure 1A:
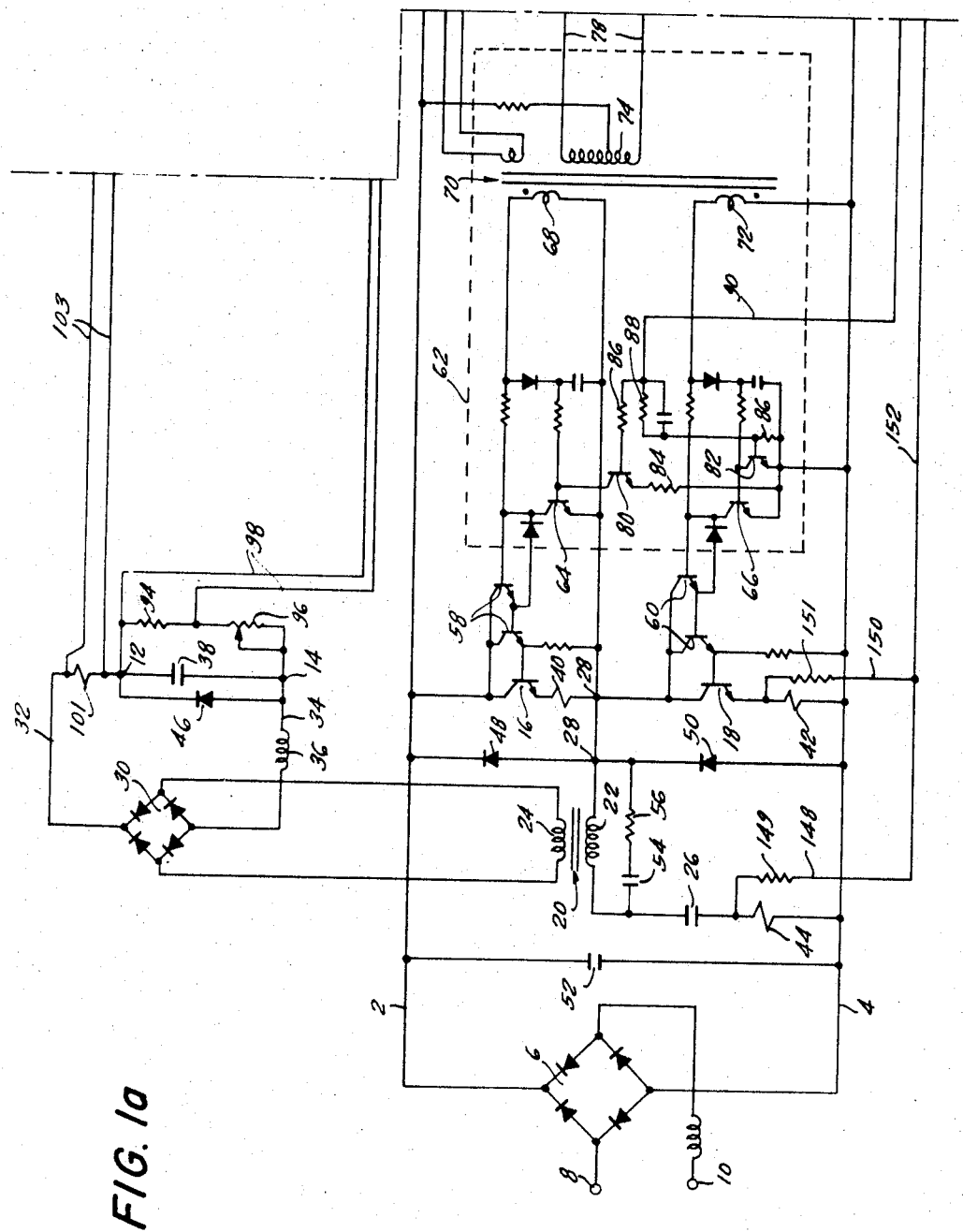

The present invention relates to a transistorized power supply designed to regulate or otherwise control the output thereof, and in particular to such a device including a pair of alternately energized switching transistors the on-off times of which are varied in order to appropriately modify the output circuit parameter or parameters in question.

In transistorized switching-type power supplies of the type under discussion, each of the switching transistors designed to carry the output power is alternately rendered potentially conductive. The length of time that a given power transistor is rendered conductive during that period when it is potentially conductive controls the circuit output both of voltage and current—the longer the time that the power transistor is rendered conductive, the greater is the output. Although power supplies of this general type are known (one such power supply is disclosed in my pending application Ser. No. 531,286, filed Mar. 2, 1966 and entitled "Voltage Control System" and assigned to the assignee of this application) certain problems exist which limit their use in certain installations which have particularly stringent requirements in terms of speed of response, stability and accuracy. The system of the present invention provides controls which enables systems of the type under discussion to be used where such stringent requirements exist.

n addition, power supplies of the type under discussion in general suffer from those limitations pointed out in my aforementioned application Ser. No. 531,286, to wit, limitations on their voltage output, power handling capacity and efficiency, resulting in systems of excessive size and weight. The system described in my aforementioned copending patent application effectively minimizes these latter limitations; the system of the present invention does so also, and to an intensified degree.

An output parameter, such as voltage, controls the on-off times of the power transistors by comparing the sensed output parameter with a reference voltage, preferably of sawtooth shape. As the output parameter falls below its desired value, the on-time of each power transistor is increased. As the output parameter rises above its desired value, the on-time of each power transistor is decreased.

In my copending application Ser. No. 531,286 the power transistors are connected in shunt with one another across the input line, each of those transistors being connected in series with a separate part of the primary winding of the output transformer. This arrangement calls for the use of a larger-than-necessary transformer, since in effect two primary windings must be provided, one connected to each of the power transistors. This not only adds to cost, size and weight but also decreases efficiency. It also requires the use of transistors that can safely withstand forward blocking voltages that are double the applied input voltage. In accordance with the present invention the two transistors are connected in series across the input line, with the primary winding of the output transformer being connected to a point between the two transistors. Thus only a single winding need be provided which carries the currents of both of the power transistors and each transistor will have a voltage applied thereto which will not exceed the input voltage, thus resulting in a saving in cost, size and weight and an improvement in efficiency.

But this arrangement presents its own problem, to wit, the fact that if both power transistors are simultaneously conductive, even for a very short period of time, a short circuit will be created across the input line, exceptionally high currents will flow, and the possibility of damage to or even destruction of the power transistors is very real. The switching from one power transistor to the other is preferably carried on at a relatively high frequency such as 5 kilocycles per second, this being highly advantageous in that much smaller transformers can be used than if the voltage transformation were carried out at power frequencies on the order of 60 cycles per second. However, the higher the frequency involved in shifting between the power transistors, the greater is the likelihood that, under certain conditions of control requirements, both of the power transistors might be conductive at the same time, thus giving rise to the above mentioned catastrophic short circuit condition. The fact that the power transistors turn on faster than they turn off greatly aggravates the situation, and this defect to the series-connection of the power transistors across the input line has in the past greatly limited the use of a thus-designed system despite its advantages in other respects.

In order to eliminate this short-circuit possibility, means are provided in the present system for ensuring that both transistors will be off for at least a minimal period of time between each shift in the potential conductivity of the transistors, this being accompished by a means which overrides the action of the normal on-off controls as determined by the sensing of the appropriate output parameter.

Each time that the transistors shift between on and off condition there are losses in the system, and these losses reduce the efficiency of the system. It therefore is important to limit the number of times that a transistor switches to the minimum number of times needed to produce proper output control. However, situations tend to arise in practice where transient spikes in the signal derived from the output circuit parameter produce fluctuations of a given power transistor between on and off conditions within a given period of potential conductivity. In order to prevent this type of multiple switching, means are provided for sensing when such switching occurs and for thereafter, during that particular period of potential conductivity of a given transistor, preventing any change in the status of the system. For example, when the reference voltage exceeds the parameter-sensing voltage, thus turning off the then potentially conductive power transistor, means are provided for lifting the reference voltage to an appropriately high value such that voltage spikes in the parameter-controlled voltage will have no effect, the reference voltage being automatically returned to its normal level when the then-existing period of potential conductivity of that particular transistor ends and the period of potential conductivity of the other power transistor begins.

Since each of the power transistors is alternately conductive, it is important that the output from each of those transistors be substantially the same. If this were not the case we would have different output parameters for each half of the switching cycle, these different output parameters would be sensed and would in turn control the conductivity of the individual transistors during their respective halves of the switching cycle, and under certain conditions a regenerative situation could occur which would seriously affect the stability of the system. Accordingly, means are provided to ensure that, within each cycle, the on-times of each of the transistors is substantially the same. Two different systems are disclosed for this purpose which are preferably, but not necessarily, used together. One system senses the voltage output produced by each transistor and, overriding the other on-off timing controls, modifies the on-times of the transistors so as to lengthen the on-time of that transistor which produces the lesser voltage output and decrease the on-time of that transistor which produces the greater voltage output. This voltage-sensing balancing control is effective but sometimes is not rapid enough and consequently, a current-sensing balancing control system is also disclosed, this latter system directly sensing the current passed by each power transistor and, in accordance with that sensing, directly and rapidly modifying the timing control so as to bring the current outputs of the transistors back into balance.

The system of the present invention can readily be adapted for primary control by one or more output circuit parameter and overriding control by another circuit parameter such as energizing current. This is significant when it is realized that the AC energizing current may be, at a given instant, many times greater than the DC output current. The energizing current passes through the power transistors, and it is important to protect them against overloading. In accordance with one embodiment here disclosed the energizing current is sensed by utilizing a single capacitor connected in shunt with one of the power transistors, there being no comparable capacitor in shunt with the other power transistor, cooperatingly acting signal-voltage-deriving resistors being provided in series with the capacitor and the power transistor which is connected in shunt therewith. Since all of the alternating output current will flow through that capacitor, while only alternate half cycles of the output current, all in the same direction, will flow through that transistor, a proper weighting and combination of the voltage signals derived from said capacitor and transistor will result in a unidirectional voltage signal the magnitude of which for each half cycle will be a very accurate measure of the magnitude of the energizing current in the then-conductive power transistor. This signal can then be used for overriding control of the on-off times of the power transistors with a high degree of accuracy and positiveness. In another embodiment the energizing current is directly sensed during each half cycle and the signal thus produced is utilized for such overriding control as well as for current balancing purposes.

Figure 2A:
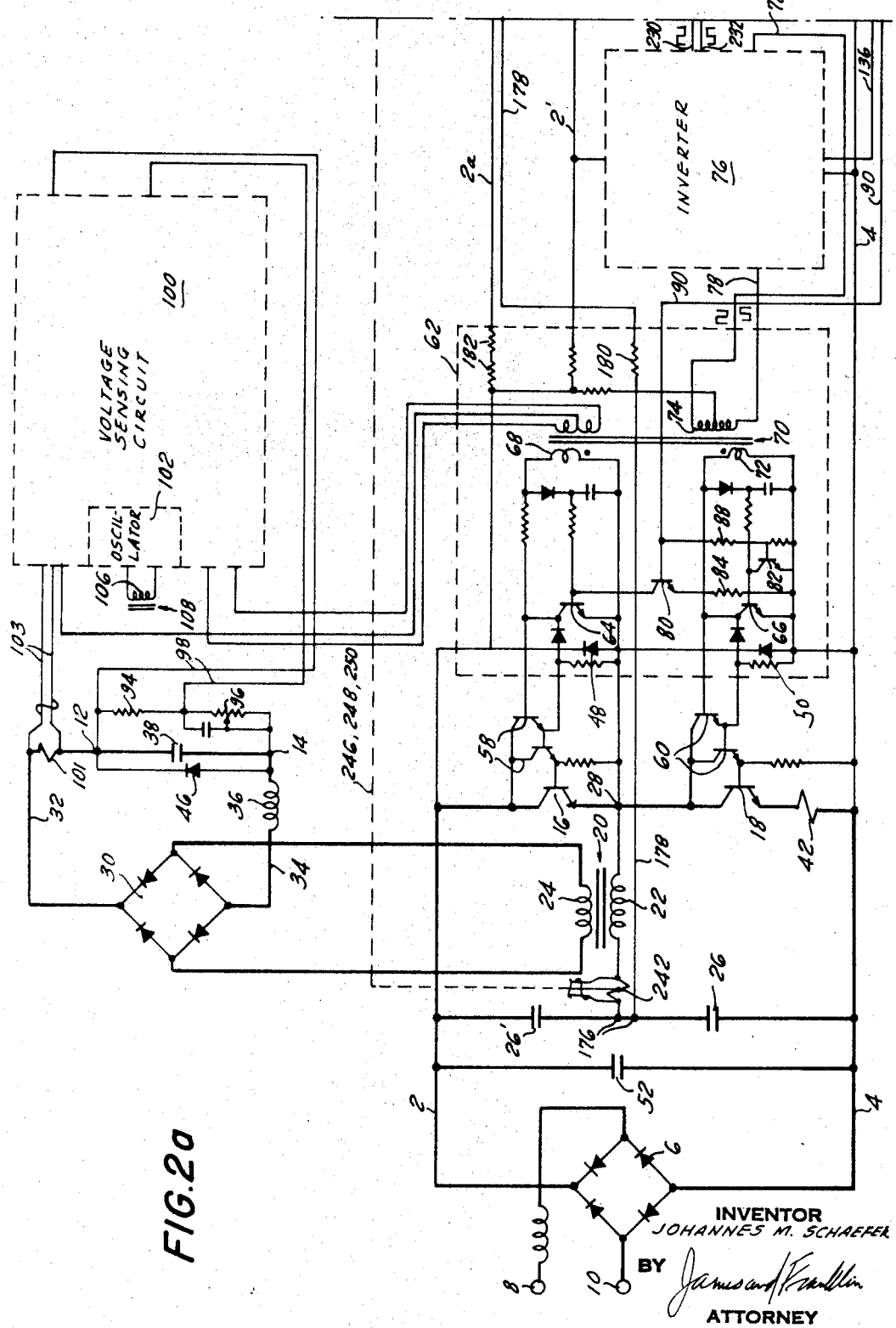
Figure 2B:
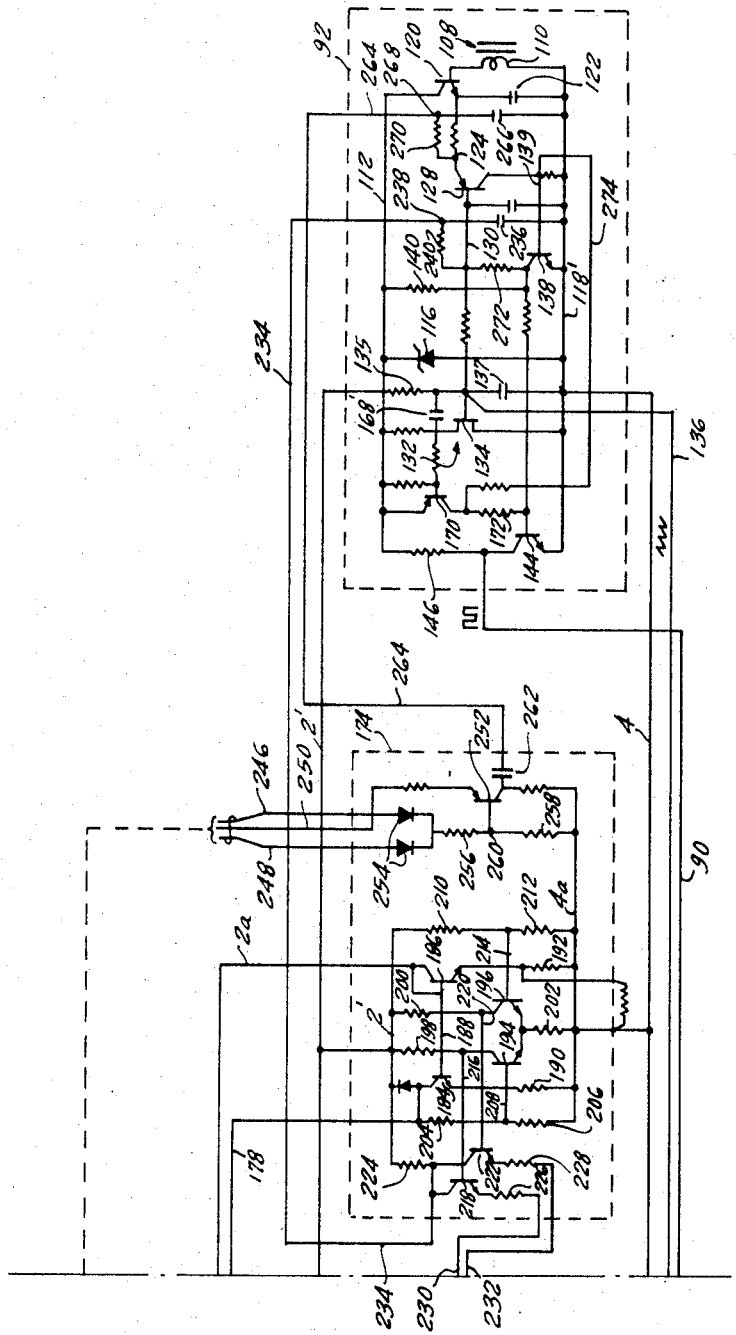

To the accomplishment of the above, and to such other objects as may hereinafter appear, the present invention relates to a transistorized switching-type power supply as defined in the appended claims and as described in this specification, taken together with the accompanying drawings, in which:

FIGS. 1A and 1B constitute a circuit diagram of one embodiment of the present invention; and FIGS. 2A and 2B constitute a circuit diagram of another embodiment thereof.

Turning first to the embodiment illustrated in FIGS. 1A and 1B, the input to the power supply is applied across DC lines 2 and 4. When the external power source is of the alternating type, the full wave rectifier 6 is interposed between the input terminals 8 and 10 and the input lines 2 and 4 in conventional fashion. The DC output from the power supply is provided at output terminals 12 and 14, to which any appropriate external electrical connection may be made. For controlling the output provided at the terminals 12 and 14, a pair of power transistors 16 and 18 are connected in series across the input lines 2 and 4. An output transformer 20 comprising primary winding 22 and secondary winding 24 is interposed between the input lines 2 and 4 and the output terminals 12 and 14, the primary winding 22 thereof being connected in series with capacitor 26 between the input line 4, which may be considered to be at a reference potential, and point 28 which is located between the transistors 16 and 18. The secondary winding 24 of the output transformer 20 is connected to full wave rectifier 30 the output leads 32 and 34 of which are connected to output terminals 12 and 14 via a filter defined by series inductance 36 and shunt capacitor 38. Resistors 40 and 42 may be connected in series with the power transistors 16 and 18 respectively, resistor 44 may be connected in series with capacitor 26, protective rectifiers 46, 48 and 50 may be connected across the capacitor 38 and the power transistors 16 and 18 respectively, a filter condenser 52 may be connected across the input lines 2 and 4 in advance of the power transistors 16 and 18, and a protective circuit comprising series connected capacitor 54 and resistor 56 is connected across the primary winding 22 of the transformer 20. The power transistor 16 is provided with a pair of Darlington-connected driver transistors 58 and the power transistor 18 is provided with a pair of Darlington-connected driver transistors 60.

Means are provided for controlling the power transistors 16 and 18 through their respective driver transistors 58 and 60 so that each of the power transistors 16 and 18 is alternately rendered potentially conductive for a short period of time, and further means are provided for controlling the actual period of time, during the period of potential conductivity, when a given power transistor is actually conductive.

The actuation of the power transistors 16 and 18 is accomplished by the circuitry enclosed within the broken line 62 in FIG. 1A. Operatively connected to the driver transistors 58 is a bypass transistor 64, and operatively connected to the driver transistor 60 is a bypass transitor 66. The emitter and collector of the bypass transistor 64 are connected across the secondary winding 68 of a transformer 70, and the collector and emitter of the transistor 66 are connected across the secondary winding 72 of the transformer 70, those two windings being wound in opposite senses, so that, for a given signal in the primary winding 74 of the transformer, the upper end of the winding 68 is positive and at the same time the lower end of the winding 72 is positive. The upper end of the winding 68 is not only connected to the collector of the bypass transistor 64 but is also connected to the base of a driving transistor 58; the lower end of the winding 68 is connected to the point 28 between the power transistors 16 and 18. The upper end of the winding 72 is not only connected to the collector of the transistor 66 but is also connected to the base of a driving transistor 60; the lower end of the winding 72 is connected to the input line 4.

Thus it will be seen that when a given bypass transistor 64 or 66 is not conductive the windings 68 and 72, if appropriately energized, will provide base current for their respective driving transistors 58 or 60, thus turning the respective power transistors 16 and 18 on, whereas if the windings 68 or 72 are thus energized but the bypass transistors 64 or 66 are conductive, those bypass transistors will shunt base current from their respective driving transistors 58 and 60 and thus turn off the respective power transistors 16 and 18. It will further be apparent that, because of the senses in which the windings 68 and 72 are wound, only one or the other of them at a given instant will be energized to provide base current for their respective driving transistors 58 and 60. Depending upon which one of the driving transistors 58 and 72 is appropriately energized, its corresponding power transistor 16 or 18 will be rendered potentially conductive, while the other power transistor will be rendered non-conductive because there is then no source of base current for its driver transistors. Whether or not the potentially conductive power transistors 16 or 18 will in fact be conductive will depend upon the status of its corresponding bypass transistor 64 or 66; if that bypass transistor is conductive the power transistor will be off, and if that bypass transistor is non-conductive the power transistor will be on.

Energization of the windings 68 and 72 is derived from a suitable timing source such as the inverter 76 which produces a square wave output carried along lines 78 to the primary winding 74 of the transformer 70. Thus the output of the inverter 76 determines which of the power transistors 16 or 18 is potentially conductive. The square wave frequency is at a comparatively high value, such as 5 kilocycles per second, thus causing shifts in the potential conductivity of the transistors 16 and 18 to occur very rapidly.

The status of the bypass transistors 64 and 66 is determined by their respective control transistors 80 and 82, each of which has its collector connected to the base of the corresponding bypass transistor and has its emitter connected to reference line 4. Resistor 84 is in series with the emitter of control transistor 80 for current limiting purposes. The bases of control transistors 80 and 82 are connected, via resistors 86 and 88 respectively, to signal line 90 which carries a control signal derived from the control circuitry enclosed within the broken line rectangle 92 in FIG. 1B. The magnitude of the signal carried by line 90 will affect the bases of the control transistors 80 and 82, and thus determine whether the latter are conductive or non-conductive. If they are thus rendered conductive the bypass transistors 64 and 66 will be rendered non-conductive and that one of the power transistors 16 and 18 which is potentially conductive will be rendered actually conductive. Conversely, if the control transistors 80 and 82 are rendered non-conductive by the signal 90, the bypass transistors 64 and 66 will be rendered conductive and hence both of the power transistors 16 and 18, including that one which is potentially conductive, will nevertheless be non-conductive.

The control arrangement is such that under normal circumstances each of the power transistors 16 and 18 will be conductive for a portion of that period when it is potentially conductive. The relationship between its actual period of conductivity and its maximum period of potential conductivity will determine its output; the greater that relationship, the greater will be the output. When power transistor 16 is conductive current will flow from right to left through the primary winding 22 of transformer 20, charging capacitor 26. On the next half cycle, when power transistor 18 is conductive, current will flow from left to right through the primary winding 22, discharging capacitor 26. The alternating current in the primary winding 22 will induce an alternating current in the secondary winding 24, that will be rectified by the rectifier 30, and a DC voltage and current will be provided at the output terminals 12 and 14.

The output voltage is sensed by the adjustable voltage divider defined by fixed resistor 94 and adjustable resistor 96. Leads 98 sense the voltage across resistor 94 and actuate the output sensing circuit generally designated 100. Output current may be sensed at 101 and fed by leads 103 to the output sensing circuit 100 to provide output current control as well, as is conventional. The precise nature of the voltage sensing circuit 100 forms no part of the present invention, and consequently it is disclosed in block form. The signal from the output sensing circuit 100 is connected to oscillator circuit 102 by signal leads 104. The output from the oscillator circuit 102 has a constant frequency such as 5 megacycles per second but has an amplitude which varies inversely with the sensed output parameters of voltage and/or current. That oscillator output is applied to primary winding 106 of transformer 108 having secondary winding 110. The output from the secondary winding 110 is fed to the control circuitry 92, thereby to affect the conductivity status of the control transistors 80 and 82 for the bypass transistors 64 and 66 respectively.

Turning now to the details of the control circuitry enclosed within the rectangle 92, the upper lead 112 thereof is connected through a resistor to the DC input lead 2, and the lower line 114 thereof is connected to the input line 4, and is at reference potential. Zener diode 116 is connected between lines 112 and 118, the latter being connected to and therefore at the potential of the line 114. Transistor 120 has its collector connected to line 112, and its base electrode is connected to the output of the secondary winding 110 of the transformer 108, the amplitude of the output of that secondary winding 110 being inversely related to the voltage sensed at the output terminals 12 and 14 through the action of the output sensing circuit 100 and the oscillator circuit 102. The output of the winding 110, intensified and rectified by the transistor 120 connected to function as an emitter-follower, charges capacitor 122 connected between the emitter of transistor 120 and line 118, thus making the voltage at line 124 representative of and variable inversely with respect to the sensed output voltage across the output terminals 12 and 14 of the system. The voltage at line 124 is transferred to the emitters of transistors 126 and 128, the collectors of which are connected to line 118. The base of transistor 128 is connected by line 130 to a relaxation oscillator generally designated 132 and comprising unijunction transistor 134, the output of that relaxation oscillator being in the form of a sawtooth voltage the frequency of which is determined by the values of resistor 135 and capacitor 137 connected between lines 112 and 118. Line 136 connects the relaxation oscillator 132 with the inverter circuit 76 for synchronizing purposes, a sawtooth voltage being generated for each half cycle of the square wave output of the inverter circuit 76.

The transistor 128 thus functions as a means for comparing a reference voltage defined by the sawtooth voltage output from the relaxation oscillator 132 with the signal on line 124 which is representative of the selected system output parameter or parameters. When the output voltage signal on line 124 is in excess of the sawtooth voltage signal on line 130, the transistor 128 will be conductive through its emitter-collector circuit.

The collector of transistor 128 is connected by lead 139 to the base of transistor 138, the emitter of which is connected to the line 118 and the collector of which is connected to line 112 via resistors 140 and 142. The collector of transistor 138 is connected to the base of transistor 144, the emitter of which is connected to line 118 and the collector of which is connected to line 112 via resistor 146. The collector of transistor 144 is also connected to the signal line 90 from the switching control circuit 92.

The operation of the switching control circuit 92, as thus far described, is as follows: When the voltage representative of the sensed parameter or parameters of the system, which is provided on line 124, exceeds the sawtooth voltage on line 130, transistor 128 becomes conductive. When it becomes conductive base current is provided to transistor 138, thus rendering the latter conductive. When the transistor 138 is conductive it bypasses base current for the transistor 144, rendering the latter nonconductive. When the transistor 144 is not conductive the line 90 is substantially at the potential of the line 112, and this permits base current to flow therethrough to the transistors 80 and 82, thus rendering those transistors conductive. As a result, the bypass transistors 64 and 66 for the power transistors 16 and 18 respectively are turned off, and hence that one of the power transistors 16 and 18 which is rendered potentially conductive by the square wave output from the inverter circuit 76 is thus rendered actually conductive. As soon as the voltage at the base of transistor 128, this being the sawtooth voltage output from the relaxation oscillator 132, exceeds the voltage on line 124 which is representative of the output parameter, the transistor 128 will be turned off. There will no longer be base current supplied to transistor 138, that will turn off, base current will be provided to transistor 144, that will turn on, it will bypass the base current for the transistors 80 and 82, those transistors will be turned off, the bypass transistors 64 and 66 for the power transistors 16 and 18 respectively will be turned on, and thus neither of the power transistors 16 or 18 will be actually conductive, even though one or the other of them is rendered potentially conductive from the square wave output of the inverter circuit 76.

Thus, whether a given power transistor 16 or 18, when it is potentially conductive, will be actually conductive or not is determined by the relationship between the sawtooth voltage output from the relaxation oscillator 132 and the output parameter signal on line 124; when the output parameter signal is greater than the sawtooth voltage, the potentially conductive power transistor 16, 18 will be actually conductive (on), and when the output parameter signal is less than the sawtooth voltage the potentially conductive power transistor 16, 18 will be non-conductive (off). Hence it will be seen that the greater the output parameter signal on line 124, the greater is the period of time that the power transistors 16 and 18 will be on during their periods of potential conductivity, and conversely, the lower the output parameter voltage on line 124, the less is the relative length of time that those power transistors will be on during their periods of potential conductivity. The output parameter voltage on line 124 is, as we have seen, inversely related to the relevant output parameter—as the output voltage, for example, rises, the voltage on line 124 will fall, and vice versa.

Turning our attention again to the power circuit, and to the fact that there is a capacitor 26 connected across the power transistor 18 but no corresponding capacitor connected across the power transistor 16, it has been noted that as a result all of the output current will flow through the capacitor 26 in one direction or the other, thus producing at the resistor 44 a square wave output, while only half of the output current flows through the power transistor 18, thus producing at the resistor 42 a series of separated unidirectional voltage pulses. Lines 148 and 150, with resistors 149 and 151 respectively, are connected as shown. If the value of resistor 151 is made half that of resistor 149, and if the currents through those two resistors 149 and 151 are combined, as by connecting the lines 148 and 150 to line 152, there will be produced on line 152 a current the magnitude of which will be closely representative of the magnitude of the energizing current for transformer 20 during the time that each of the power transistors 16 and 18 are respectively conductive. The use of but a single capacitor across but a single power transistor 18 increases the accuracy of the energizing current measurement in this fashion, since there is relatively no current component in the capacitor 26 other than that representative of the energizing current. This is to be contrasted with the situation in which a pair of capacitors are connected in series across the two power transistors 16 and 18, as in the embodiment of FIGS. 2A and 2B subsequently to be described; in that latter case the two capacitors in question are in shunt with the filter capacitor 52, so that some of the current through those two capacitors is in fact independent of the energizing current through the transformer primary winding 22.

The presence in the line 152 of a current which is representative of the energizing current during each half cycle of system operation is used to provide a balancing control for ensuring that each of the power transistors 16 and 18 carries a substantially equal share of the energizing current. It also provides an overriding control for the power supply ensuring that the energizing current carried by the power transistors 16 and 18 does not exceed a safe value. To that end the line 152 is connected, via voltage divider defined by resistors 154 and 156, to line 112. The point 158 between the two resistors 154 and 156 is connected to the base of transistor 160, the emitter of which is connected to line 114 and the collector of which is connected to the base of transistor 126. The base of transistor 126 is also connected to point 162 which is located between resistor 164 and capacitor 166, the resistor 164 and capacitor 166 being connected in series with one another between the lines 112 and 118.

If the signal at the base of transistor 160, which is representative of the current through the line 152 and hence corresponds to the instantaneous energizing current of the system, exceeds a predetermined value, the transistor 160 is turned on. When the transistor 160 is on capacitor 166 discharges and transistor 126 turns on, that transistor being electrically connected in the circuit in an emitter follower configuration. When transistor 126 is conductive the voltage on line 124 is clamped to line 118, thus bringing the voltage at the emitter of transistor 128 to a potential below that of the base thereof, transistor 128 is turned off, and this, acting through transistors 138, 144, 80 and 82 and 64 and 66, ensures that that one of the power transistors 16 and 18 which is potentially conductive is nevertheless non-conductive.

We have already noted that when transistor 160 becomes conductive capacitor 166 will discharge, thus turning transistor 160 off. However, the low voltage at point 162 will persist, keeping transistor 126 conductive, for a period determined by the time constant of the circuit defined by resistor 164 and capacitor 166. The capacitor 166 will slowly charge through resistor 164, and when it has charged to a predetermined degree transistor 126 will be turned off, and the system will once again be in condition to be controlled by the energizing current signal on line 152. Hence, if the current in the energizing circuit during one half-cycle exceeds that in the other half-cycle the off-time of the power transistor corresponding to said one half-cycle is automatically increased, thus ensuring that its energizing current is thereafter reduced relative to that of the other power transistor. Hence current balancing is achieved. In addition, if the energizing current should at any time exceed a safe value, the off-times of the power transistors would be quickly and reliably increased.

Further, it is seen that the overriding current control provided by the circuitry in question will persist for a predetermined period of time as controlled by the design of the timing circuit 164, 166, during which period the voltage output signal on line 124 will be ineffective to control the on-off times of the potentially conductive power transistors 16 and 18, but after the predetermined interval provided for current control has passed, voltage control will once again take over.

When maximum system output is required, as when, for example, the system output voltage is considerably below that desired, the on-times of the power transistors 16 and 18 will be increased, and under certain circumstances those on-times may be called upon to equal the total periods of potential conductivity of the transistors 16 and 18 respectively. Thus when each of the transistors shifts from potentially conductive to potentially non-conductive, the formerly potentially conductive transistor will have been actually conductive right up to the time that the period of potential conductivity terminates. These power transistors have a characteristic of turning on faster than they turn off, and consequently there is a possibility, under the circumstances outlined, that both of the transistors 16 and 18 might be on at the same instant, in which case there would be a short circuit across the input lines 2 and 4. The possibility of this occurring is eliminated by providing capacitor 168 between lines 130 and 139. The capacitor 168 transmits each down-going part of the sawtooth voltage output from the relaxation oscillator 132 to the base of transistor 138, turning that transistor 138 off for a short period of time. As we have seen, when the transistor 138 is off, the bypass transistors 64 and 66 are turned on and hence neither of the power transistors 16 and 18 can be conductive, even though they may be potentially conductive. The effect of the capacitor 168 in thus ensuring that both of the power transistors 16 and 18 are off is of short duration, determined by the length of time that it takes capacitor 168 to recharge after it has transmitted the aforementioned down-going part of the sawtooth voltage reference signal to the base of transistor 138. The period of time during which capacitor 168 is thus operatively effective may be on the order of 10 microseconds, about 10% of each sawtooth period.

There is, of course, one sawtooth period for each half cycle of the square wave output from the inverter circuit 76, in other words, one sawtooth signal for each period of potential conductivity of each of the power transistors 16 and 18.

The embodiment of FIGS. 2A and 2B represent an alternative, and in some respects more sophisticated and preferred, embodiment of the power supply of the present invention. Those elements in the embodiment of FIGS. 2A and 2B which have substantial counter-parts in the previously described embodiment of FIGS. 1A and 1B are identified by the same reference numerals, and the general description of operation of the system as set forth with regard to the embodiment of FIGS. 1A and 1B is also applicable to the embodiment of FIGS. 2A and 2B. The latter embodiment differs from the previously described embodiment in that in accordance with more conventional approach, capacitors are connected in shunt with both of the power transistors 16 and 18. Different circuitry is employer to ensure that there is a period at the beginning of each half cycle of operation when both of the power transistors 16 and 18 are off. Means are provided to reduce switching losses which might otherwise be caused by "spikes" or other similar irregularities in the voltage output. Also, the circuitry of FIGS. 2A and 2B provides different and faster acting means for ensuring that each of the power transistors 16 and 18 shares the load equally with the other, this being an important consideration insofar as circuit stability is concerned, for reasons set forth above.

Thus, as may be seen in FIG. 2A, a capacitor 26' is connected in shunt with the power transistor 16, the capacitor 26' being the counterpart of the capacitor 26 which is connected in shunt with the transistor 18.

In the switching control circuitry 92, the capacitor 168' is designed to correspond to the capacitor 168 in the embodiment of FIGS. 1A and 1B and to cause both of the power transistors 16 and 18 to be turned off for a predetermined period of time at the beginning of each half cycle of operation. As specifically disclosed in FIG. 2B, the capacitor 168' connects the output of the relaxation oscillator 132 which produces the sawtooth voltage reference signal with the base of a transistor 170, the emitter of which is connected to line 112 and the collector of which is connected, via resistor 172, to the base of transistor 144. Each downward going portion of the sawtooth voltage constituting the output of the relaxation oscillator 132 causes a charging current to pass through the capacitor 168', thus turning transistor 170 on. This provides base current for the transistor 144, turning it on, this in turn causing the voltage on line 90 to be reduced to correspond to that of line 118. As has been explained in connection with the first embodiment, when the voltage on line 90 is reduced, the transistors 80 and 82 which control the bypass transistors 64 and 66 are turned off, the bypass transistors 64 and 66 are turned on, and consequently neither of the power transistors 16 or 18 can be on.

As has been indicated at the outset of this specification, stability problems may arise unless means are provided to ensure that the load carried by each of the power transistors 16 and 18 is equalized. The circuits for providing this balancing effect are enclosed within the rectangle 174 of FIG. 2B.

One circuit arrangement senses the cumulative voltage outputs of the two power transistors 16 and 18 and provides for balancing in accordance therewith. This type of balancing is relatively slow acting and may be considered as a static type of balance. The point 176 between the two capacitors 26 and 26' will rise or fall in voltage depending upon whether, as the system operates, the power transistor 16 or the power transistor 18 has the gerater output. The lead 178 connects point 176 to the balancing circuit 174. Resistor 180 is connected in series therewith. Resistor 182 is connected in line 2a which connects the upper voltage input line 2 to the balancing circuit 174. The resistor 182 has twice the value of the resistor 180. Line 178 is connected to the collector of transistor 184. Line 2a, in which the resistor 182 is connected, is connected to the collector of transistor 186. The collector and base of the transistor 186 are connected together, so that the transistor 186 functions as a rectifier between the line 2a and the line 4a which is at reference potential. The bases of the transistors 184 and 186 are connected to one another by lead 188. The emitters of transistors 184 and 186 are connected to line 4a via resistors 190 and 192 respectively. Transistors 194 and 196 have their collectors connected to line 2' via resistors 198 and 200 respectively and have their emitters connected to one another and connected to line 4a via resistor 202. Line 178 is connected to line 4a via voltage divider composed of resistors 204 and 206, and the base of transistor 194 is connected to a point between the resistors 204 and 206 by lead 208. A voltage divider defined by resistors 210 and 212 is connected between lines 2' and 4a, and the base of transistor 196 is connected by lead 214 to a point between the resistors 210 and 212. The collector of transistor 194 is connected by lead 216 to the base of transistor 218, and the collector of transistor 196 is connected by lead 220 to the base of transistor 222. The collectors of the transistors 218 and 222 are both connected to line 2' via resistor 224, and their emitters are connected via resistors 226 and 228 respectively to lines 230 and 232 respectively, which lines are fed with oppositely polarized square waves derived from the inverter circuit 76. The collectors of transistors 218 and 222 are connected by lead 234 to line 118' in the control circuitry 92 via capacitor 236, the point 238 between the capacitor 236 and the line 234 being connected via resistor 240 to line 130 and hence to the base of transistor 128.

The operation of this voltage balancing circuit is as follows: If one or the other of the power transistors 16 and 18 over a period of time has a greater output than the other, the voltage of the point 176 will move up or down, depending upon which power transistor is producing the greater load. Under normal conditions the voltage on line 2 will be twice the voltage of line 178 relative to the line 4, and for that reason the magnitude of the resistor 182 is made twice the magnitude of the resisor 180, so that under such normal conditions, with the voltage of point 176 being midway between that of lines 2 and 4, the current flowing through the lines 178 and 2a will be the same. If the voltage at point 176 should vary from that normal value, there will be a different flow of current through line 178 than through line 2a. Hence the voltage applied to the collector of transistor 184 will differ from the voltage applied to the collector of transistor 186, a different amount of current will flow to the base of transistor 194 than will flow to the base of transistor 196, the collector of transistor 194 will then be at a different voltage from the collector of transistor 196, and hence the voltage of the base of transistor 218 will become different from the voltage at the base of the transistor 222. The transistors 218 and 222 are alternately rendered potentially conductive in synchronism with the power transistors 16 and 18 respectively by the square wave signals derived from the inverters 76 and applied to the emitters of those transistors via lines 230 and 232. If the bases of the transistors 218 and 222 are at different voltages they will conduct differently when they are thus rendered potentially conductive, and consequently the voltage across resistor 224 will be different when the transistor 218 is conductive and when the transistor 222 is conductive. Hence the voltage on line 234 will fluctuate at a frequency corresponding to the output of the inverter 76. This fluctuating voltage will in turn be transmitted to the sawtooth reference voltage on line 130, raising that voltage or lowering it in such a fashion as to increase the on-time of that transistor 16 or 18 which is carrying the lesser load.

For a faster acting or dynamic control of balancing, a current sensing element 242 is connected in series with the primary winding 22 of the output transformer 20. The output from the element 242 is conveyed to the balancing circuit 174 by lines 246 and 248 and center line 250. A transistor 252 has its emitter connected to the line 250 and has its collector connected to the line 4a. The lines 246 and 248 are connected via rectifiers 254 to line 4a via resistors 256 and 258, the point 260 between those resistors being connected to the base of the transistor 252. The collector of the transistor 252 is connected via capacitor 262 and line 264 to the control circuitry 92, the line 264 being connected to line 118' via capacitor 266 and a point 268 above the capacitor 266 being connected to line 124 via resistor 270.

The operation of this dynamic current balancing circuit is substantially as follows: As energizing current flows in one direction or the other through the element 242, the voltage at lines 248 and 246 respectively goes up relative to the voltage at center line 250. This affects the conductivity of transistor 252; the greater the voltage of its base the less that transistor will conduct. The rectifiers 254 carry current for alternate half cycles, the base voltage being derived a point 260 between the voltage divider resistors 256 and 258. The capacitor 262 couples the voltage at the collector of transistor 252 to transistor 128. The steeper or more abrupt voltage change which will occur on that cycle where a given power transistor 16 or 18 is providing the greater current will have the effect of turning transistor 128 off sooner than would otherwise be the case, thus ensuring that, as the sequence of energization of the power transistors 16 and 18 continues, the current will be more equally balanced between those two power transistors.

The circuitry of FIGS. 2A and 2B includes another important refinement. Quite often the voltage output is not steady, but instead consists of fast rising voltage spikes or other transient phenomena. After a given power transistor has been turned off, but while it is still potentially conductive, if such a voltage spike should occur that power transistor would be turned on again. This is undesirable, since it gives rise to excessive switching losses. In order to prevent this, means are provided so that each time that a power transistor is turned off, that is to say, when the voltage of the sawtooth reference voltage exceeds that of the system output voltage signal, the sawtooth voltage is lifted in potential to a value such as not to be affected by voltage spikes in the output, the sawtooth reference voltage being restored to its normal value as soon as the period of potential conductivity of the then potentially conductive power transistor 16 or 18 has come to an end. Hence the reference voltage can function properly for the next power transistor during the time that it is potentially conductive.

To this end the collector of transistor 138 is connected by resistor 272 to line 130 on which the sawtooth voltage reference signal appears. Each time that transistor 138 is turned off, as will occur when the sawtooth reference voltage exceeds the output signal voltage, its collector goes up in potential, and this rise in potential is transmitted to the line 130, causing the sawtooth reference voltage to rise correspondingly in potential to a value such that voltage spikes will not exceed it. Transistor 170, we have seen, is turned on each time that the sawtooth voltage goes down. When it is turned on it feeds through line 274 which connects its collector to the base of transistor 138, turning transistor 138 back on, thus returning the voltage at line 130, and hence the sawtooth reference voltage, to its normal value.

The power supplies of the present invention will therefore be seen to function at a high switching frequency, thereby permitting minimization of size and weight, particularly insofar as the output transformer is concerned. The arrangement of the power transistors in series across the input reduces the voltage applied across those transistors and thus increases their reliability and longevity, while at the same time the power transistors are so controlled as to eliminate the possibility of an accidental short circuit across the input line arising from the existence of a simultaneous actual conduction status for both of the transistors. Fast and accurate response is combined with stability by circuitry which ensures that the power transistors will share the load equally. Fast acting overriding current control is provided, protecting the power supply and the load connected thereto from the deleterious effect of excessively high currents. Switching losses are minimized by preventing switching action caused by transients or spikes in the output voltage. All of this is accomplished by means of reliable circuitry which can readily be adjusted to produce desired output control characteristics.

While but a limited number of embodiments of the present invention have been here specifically disclosed, it will be apparent that many variations may be made therein, all within the scope and spirit of the invention.

I claim:

1. A power supply comprising an input circuit, an output circuit, and first and second power transistors connected between said input and output circuits, means for producing a first signal to selectively render said first and second transistors alternately potentially on, means for producing a second signal to turn said potentially-on transistor on and off, means establishing a cycle for said first signal, and means operatively connected between said cycle means and said first and second transistors and effective to turn both said transistors off for at least a predetermined period of time each time that said first signal shifts the potential on-off status of said first and second transistors, in which said cycle establishing means comprises means for generating a sawtooth voltage, said transistor turn-off means comprising a control transistor and an operative connection between said sawtooth voltage means and said control transistor effective to modify the conductive status of said control transistor as said sawtooth voltage varies in a given direction.

2. In the power supply of claim 1, means for sensing the output from each power transistor, and overriding control means operatively connected between said sensing means and said power transistors and effective, in response to the sensing of a difference between the outputs of said transistors, to vary the on-off times of each of said power transistors in opposite directions such as to cause the outputs of said power transistors to equalize.

3. In the power supply of claim 1, means for sensing the output from each power transistor, and overriding control means operatively connected between said sensing means and said power transistors and effective, in response to the sensing of a difference between the outputs of said transistors, to vary the on-off times of each of said power transistors in opposite directions such as to cause the outputs of said power transistors to equalize, said output sensing means comprising means for deriving first and second sensing signals corresponding to voltages produced by said first and second power transistors respectively, and a balancing circuit to which said sensing signals are fed and which is effective to produce first and second cyclically sequential control signals corresponding respectively to said sensing signals for said first and second power transistors, and means for feeding said control signals to said overriding control means.

4. In the power supply of claim 1, means for sensing the output from each power transistor, and overriding control means operatively connected between said sensing means and said power transistors and effective, in response to the sensing of a difference between the outputs of said transistors, to vary the on-off times of each of said power transistors in opposite directions such as to cause the outputs of said power transistors to equalize, said output sensing means comprising means for deriving first and second sensing signals corresponding to voltages produced by said first and second power transistors respectively, and a balancing circuit to which said sensing signals are fed and which is effective to produce first and second cyclially sequential control signals corresponding respectively to said sensing signals for said first and second power transistors, and means for feeding said control signals to said overriding control means, said means for producing said second signal controlling the on-off times of said transistors by comparing a reference potential with a parameter potential cyclically in alternating time periods for said first and second power transistors respectively, said overriding control means varying one of said reference and parameter potentials in accordance with said first and second control signals respectively in synchronism with said alternating time periods for said first and second power transistors respectively.

5. In the power supply of claim 1, means for sensing the output from each power transistor, and overriding control means operatively connected between said sensing means and said power transistors and effective, in response to the sensing of a difference between the outputs of said transistors, to vary the on-off times of each of said power transistors in opposite directions such as to cause the outputs of said power transistors to equalize, said output sensing means comprising means for deriving first and second cyclically sequential sensing signals corresponding respectively to currents produced by said first and second power transistors respectively, and means for feeding said sensing singals to said overriding control means in a sense to cause that power transistor producing the greater current to turn off sooner than the other of said transistors in their respective on-off cycles.

6. A power supply comprising an input circuit, an output circuit, and first and second power transistors connected between said input and output circuits, means for producing a first signal to selectively render said first and second transistors alternately potentially on, means for producing a second signal to turn said potentially-on transistor on and off, means establishing a cycle for said first signal, and means operatively connected between said cycle means and said first and second transistors and effective to turn both said transistors off for at least a predetermined period of time each time that said first signal shifts the potential on-off status of said first and second transistors, and means for individually sensing the output from each power transistor, and overriding control means operatively connected between said sensing means and said power transistors and effective, in response to the sensing of a difference between the outputs of said transistors, to vary the on-off times of each of said power transistors in opposite directions to one another such as to cause the outputs of said power transistors to equalize.

7. In the power supply of claim 6, said output sensing means comprising means for deriving first and second sensing signals correspnding to voltages produced by said first and second power transistors respectively, and a balancing circuit to which said sensing signals are fed and which is effective to produce first and second cyclically sequential control signals corresponding respectively to said sensing signals for said first and second power transistors, and means for feeding said control signals to said overriding control means.

8. In the power supply of claim 6, said output sensing means comprising means for deriving first and second sensing signals corresponding to voltages produced by said first and second power transistors respectively, and a balancing circuit to which said sensing singals are fed and which is effective to produce first and second cyclically sequential control signals corresponding respectively to said sensing signals for said first and second power transisitors, and means for feeding said control signals to said overriding control means, said means for producing said second signal controlling the on-off times of said transistors by comparing a reference potential with a parameter potential cyclically in alternating time periods for said first and second power transistors respectively, said overriding control means varying one of said reference and parameter potentials in accordance with said first and second control signals respectively in synchronism with said alternating time periods for said first and second power transistors respectively.

9. In the power supply of claim 6, said output sensing means comprising means for deriving first and second cyclically sequential sensing signals corresponding respectively to currents produced by said first and second power transistors respectively, and means for feeding said sensing signals to said overriding control means in a sense to cause that power transistor producing the greater current to turn off sooner than the other of said transistors in their respective on-off cycles.

10. A power supply comprising an input circuit, an output circuit, and first and second power transistors connected between said input and output circuit, means for producing a first signal to selectively render said first and second transistors alternately potentially on, means for producing a second signal to turn said potentially-on transistor on and off, means establishing a cycle for said first signal, and means operatively connected between said cycle means and said first and second transistors and effective to turn both said transistors off for at least a predetermined period of time each time that said first signal shifts the potential on-off status of said first and second transistors, said power transistors being connected in series across said input circuit, a capacitor being connected in parallel with one only of said power transistors, a first resistor operatively connected to said capacitor, and a second resistor operatively connected to said one transistor, one of said resistors having a resistance value which is a multiple of resistance value of the other, and means operatively connecting said first and second resistors to said output current signal means.

11. A power supply comprising an input circuit, an output circuit, and first and second power transistors connected between said input and output circuit, means for producing a first signal to selectively render said first and second transistors alternately potentially on, means for producing a second signal to turn said potentially-on transistor on and off, means establishing a cycle for said first signal, and means operatively connected between said cycle means and said first and second transistors and effective to turn both said transistors off for at least a predetermined period of time each time that said first signal shifts the potential on-off status of said first and second transistors, in which said means for producing said second signal is effective to vary the time that said second signal is operative in accordance with the variation in a sensed parameter of said output circuit by comparing a reference signal with a signal corresponding to said sensed parameter, means for sensing when said power supply is actuated in a given sense by said comparison and for shifting the relative level of one of said parameter and reference signals in response thereto in a direction and to a degree such as to maintain said power transistor in said given sense irrespective of given variations in said parameter signal, and means operative when said other power transistor is rendered potentially on for resetting the relative levels of said one of said parameter and reference signals to its normal value.

12. The power supply of claim 11, in which said reference singal is a sawtooth signal, and said resetting means is actuated by said sawtooth reference signal.

13. A power supply comprising an input circuit, an output circuit, and a pair of alternately energized power transistors connected between said input and output circuits, means for controlling the on-off time of each of said alternately actuated power transistors in accordance with a sensed parameter in the output circuit by comparing a signal corresponding to said sensed parameter with a reference signal, means for sensing when a given power transistor is actuated in a given sense by said comparison and for shifting the relative level of one of said parameter and reference signals in response thereto in a direction and to a degree such as to maintain said power transistor in said given sense irrespective of given variations in said parameter signal, and means operative when said other power transistor is rendered potentially on for resetting the relative levels of said one of said parameter and reference signals to its normal value.

14. The power supply of claim 26, in which said reference signal is a sawtooth signal and said cyclical resetting means is actuated by said sawtooth signal.

15. A power supply comprising an input circuit, an output circuit, and a pair of alternately actuated power transistors connected between said input and output circuits, normal control means for controlling the on-off times of said power transistors respectively in response to the overall output of said power supply in said output circuit, means for sensing the individual output from each of said power transistors, and overriding control means operatively connected between said sensing means and said power transistors and effective irrespective of the action of said normal control means, in response to the sensing of a difference between the individual outputs of said transistors, to increase the off-time of that transistor having the greater output and decrease the off-time of that transistor having the lesser output, thereby to cause their respective outputs to equalize.

References Cited

UNITED STATES PATENTS

| | | | |
|---|---|---|---|
| 2,965,856 | 12/1960 | Roesel | 321—2 X |
| 3,219,906 | 11/1965 | Keller et al. | 321—2 X |
| 3,179,901 | 4/1965 | Mills | 321—2 X |
| 3,303,405 | 2/1967 | Schwartz | 321—2 |
| 3,324,377 | 6/1967 | Mills | 321—16 |
| 3,355,653 | 11/1967 | Paradissis | 321—19 X |

JOHN F. COUCH, *Primary Examiner.*

W. H. BEHA, JR., *Assistant Examiner.*

U.S. Cl. X.R.

321—2, 18, 19